US012807250B2

(12) United States Patent
Couture et al.

(10) Patent No.: US 12,807,250 B2
(45) Date of Patent: Nov. 24, 2026

(54) METHOD FOR MOUNTING A TRACK ASSEMBLY TO A VEHICLE, AND SUSPENSION AND TRACK ASSEMBLY FOR A VEHICLE

(71) Applicant: BOMBARDIER RECREATIONAL PRODUCTS INC., Valcourt (CA)

(72) Inventors: Raphael Couture, Sherbrooke (CA); Kevin Poirier, Racine (CA); Charles Roy, Orford (CA); Daniel Girard, Sherbrooke (CA); Steve Do Rego, Granby (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 1121 days.

(21) Appl. No.: 17/899,793

(22) Filed: Aug. 31, 2022

(65) Prior Publication Data

US 2023/0060865 A1 Mar. 2, 2023

Related U.S. Application Data

(60) Provisional application No. 63/239,034, filed on Aug. 31, 2021.

(51) Int. Cl.
*B62D 55/104* (2006.01)
*B62D 55/065* (2006.01)
(Continued)

(52) U.S. Cl.
CPC ........... *B62D 55/104* (2013.01); *B62D 55/10* (2013.01); *B62D 55/32* (2013.01); *B62D 55/065* (2013.01)

(58) Field of Classification Search
CPC ...... B62D 55/04; B62D 55/084; B62D 55/32; B62D 55/108; B62D 55/1086;
(Continued)

(56) References Cited

U.S. PATENT DOCUMENTS 6,257,602 B1 * 7/2001 Joerg ........................ B62D 3/12
280/93.514
8,480,106 B1 * 7/2013 Cohen .................. B60G 17/005
280/5.502
(Continued)

FOREIGN PATENT DOCUMENTS

CA 2612356 A1 * 5/2009 ........... B62D 55/112
WO WO-2006066406 A1 * 6/2006 ............. B62D 55/26

OTHER PUBLICATIONS

PowerModz, "Installing Polaris Tracks on the Ranger, PowerModz!," YouTube, published Jun. 15, 2013, available at: https://www.youtube.com/watch?v=wYICPOi3ZVk (hereinafter PowerModz) (Year: 2013).*
(Continued)

*Primary Examiner* — Christopher B Wehrly
(74) *Attorney, Agent, or Firm* — BCF LLP

(57) ABSTRACT

A method for mounting a track assembly to a vehicle comprises: pivotally connecting a frame of the track assembly to a distal end portion of an A-arm of the vehicle for permitting rotation of the track assembly about a steering axis; inserting a fastener through a fastener aperture defined in the distal end portion of the A-arm; and fastening an anti-rotation device of the track assembly to the distal end portion of the A-arm with the fastener, the anti-rotation device being connected to the frame. A suspension and track assembly for a vehicle is also disclosed.

15 Claims, 15 Drawing Sheets

(51) Int. Cl.
*B62D 55/10* (2006.01)
*B62D 55/32* (2006.01)

(58) Field of Classification Search
CPC ...... B62D 55/116; B60G 7/001; B60G 7/005; B60G 7/008; B60G 7/02
See application file for complete search history.

(56) References Cited

U.S. PATENT DOCUMENTS

| | | | | |
|---|---|---|---|---|
| 8,955,925 | B2 * | 2/2015 | Bessette | B60G 3/20 305/128 |
| 9,211,921 | B2 * | 12/2015 | Zuchoski | B62D 55/088 |
| 11,992,781 | B2 * | 5/2024 | Wood | B62D 55/065 |
| 2006/0181148 | A1 * | 8/2006 | Bessette | B62D 55/04 305/124 |
| 2007/0240917 | A1 * | 10/2007 | Duceppe | B62D 55/112 180/9.21 |
| 2011/0048816 | A1 * | 3/2011 | Bessette | B62D 55/104 180/9.1 |
| 2017/0120970 | A1 * | 5/2017 | Zuchoski | B62D 55/244 |
| 2018/0297429 | A1 * | 10/2018 | Elterman | F16C 11/0647 |
| 2020/0189671 | A1 | 6/2020 | Lussier et al. | |

OTHER PUBLICATIONS

Camso Inc., Camso ATV T4S, Installation Guidelines / Directives d'installation (version L), 5000-0500075-MAN, 2016, Canada.

* cited by examiner

METHOD FOR MOUNTING A TRACK ASSEMBLY TO A VEHICLE, AND SUSPENSION AND TRACK ASSEMBLY FOR A VEHICLE

REFERENCE TO RELATED APPLICATION

The present application claims priority to U.S. Provisional Patent Application No. 63/239,034, filed Aug. 31, 2021, the entirety of which is incorporated herein by reference.

TECHNICAL FIELD

The present technology relates to methods for mounting track assemblies to vehicles, and to suspension and track assemblies for vehicles.

BACKGROUND

Side-by-side off-road vehicles (SSVs), all-terrain vehicles (ATVs) and similar vehicles are used for utility and recreational purposes. Some users, depending on the terrain conditions, may decide to change the ground-engaging wheels with which the vehicle is originally equipped with a track assemblies. Track assemblies are particularly useful for instance when travelling over deep snow as the increased contact area between the track assemblies' tracks and the ground allows for greater floatation. Such track assemblies are typically offered as aftermarket kits.

A track assembly typically includes a frame, a drive sprocket rotationally connected to the frame, one or more idler wheels rotationally connected to the frame, an endless track disposed around the frame, the drive sprocket and the one or more idler wheels, a track tensioner and an anti-rotation device. The drive sprocket is connected to a wheel hub of the vehicle so as to be driven by the vehicle's motor, and thereby drive the endless track.

Unlike in a wheel where the entire wheel rotates, in a track assembly only the endless track and the drive sprocket make full rotations. The frame is allowed to rotate so as to pitch up and down in order to follow the terrain. However, it is desired to limit the amount of pitching of the frame. The anti-rotation device is provided to limit rotation of the frame and therefore of the track assembly. The anti-rotation is connected between the frame assembly and a portion of the vehicle.

Since vehicles originally designed to operate on wheels do not have anti-rotation devices, they do not have attachment points for connecting the anti-rotation device. For this reason, after-market suppliers of track assembly kits include various plates or adapter to be attached to the suspension of the vehicle in order to provide an attachment point for the anti-rotation device. Due to the forces applied by the anti-rotation device and the large number of times such forces are applied, these plates and adapters tend to be bulky and heavy. Also, multiple plates and adapters need to be provided by the aftermarket manufacturer if it is desired that the track assembly kit fits on different vehicles. As such, this adds costs.

Another consideration to take into account when installing a track assembly on a vehicle originally designed to operate on wheels, is that the track assembly will likely be longer than the diameter of the original wheel. As such, there is a likelihood that a front track assembly that needs to be steered could interfere with the body or other components of the vehicle once a certain steering angle is reached.

There is therefore a desire for a track assembly for a vehicle that can overcome at least some of the above-described drawbacks.

SUMMARY

It is an object of the present technology to ameliorate at least some of the inconveniences present in the prior art.

According to one aspect of the present technology, there is provided a method for mounting a track assembly to a vehicle comprising: pivotally connecting a frame of the track assembly to a distal end portion of an A-arm of the vehicle for permitting rotation of the track assembly about a steering axis; inserting a fastener through a fastener aperture defined in the distal end portion of the A-arm; and fastening an anti-rotation device of the track assembly to the distal end portion of the A-arm with the fastener, the anti-rotation device being connected to the frame.

In some embodiments, a longitudinal axis of the fastener passes through an end portion of the anti-rotation device.

In some embodiments, the fastener aperture is a first fastener aperture. Pivotally connecting the frame to the distal end portion of the A-arm comprises: operatively connecting a drive sprocket of the track assembly to a knuckle, the drive sprocket being rotationally connected to the frame of the track assembly, the knuckle being pivotally connected to the distal end portion of the A-arm with a knuckle fastener, the knuckle fastener being inserted in a second fastener aperture defined in the distal end portion of the A-arm. A center of the first fastener aperture is disposed laterally between a center of the second fastener aperture and a proximal end of the A-arm.

In some embodiments, the fastener is a first fastener and the fastener aperture is a first fastener aperture. The method further comprises: inserting the first fastener through a first bracket aperture defined in a bracket; fastening the bracket to the distal end portion of the A-arm with the first fastener; and inserting a second fastener through a second bracket aperture defined in the bracket; and fastening the anti-rotation device of the track assembly to the distal end portion of the A-arm comprises fastening the anti-rotation device of the track assembly to the bracket with the second fastener, a longitudinal axis of the second fastener passing through an end portion of the anti-rotation device.

In some embodiments, the first fastener aperture and the first bracket aperture are disposed forward of the second bracket aperture.

In some embodiments, the fastener is a first fastener and the fastener aperture is a first fastener aperture. The method further comprises: inserting a second fastener through a second fastener aperture defined in the distal end portion of the A-arm; and fastening the anti-rotation device of the track assembly to the distal end portion of the A-arm with the second fastener.

In some embodiments, pivotally connecting the frame to the distal end portion of the A-arm comprises: operatively connecting a drive sprocket of the track assembly to a knuckle, the drive sprocket being rotationally connected to the frame of the track assembly, the knuckle being pivotally connected to the distal end portion of the A-arm with a knuckle fastener, the knuckle fastener being inserted in a third fastener aperture defined in the distal end portion of the A-arm. Centers of the first and second fastener apertures are disposed laterally between a center of the third fastener aperture and a proximal end of the A-arm.

In some embodiments, a center of the first fastener aperture is disposed forward of a center of the second fastener aperture.

In some embodiments, the method further comprises: inserting the first and second fasteners through first and second bracket apertures defined in a bracket; fastening the bracket to the distal end portion of the A-arm with the first and second fasteners; and inserting a third fastener through a third bracket aperture defined in the bracket. Fastening the anti-rotation device of the track assembly to the distal end portion of the A-arm comprises fastening the anti-rotation device of the track assembly to the bracket with the third fastener, a longitudinal axis of the third fastener passing through an end portion of the anti-rotation device.

In some embodiments, the first and second fastener apertures and the first and second bracket apertures are disposed forward of the third bracket aperture.

In some embodiments, the method further comprises abutting the bracket with a bottom of the distal end portion of the A-arm.

In some embodiments, the method further comprises placing at least one wall of the bracket adjacent to at least one of a front and a rear of the distal end portion of the A-arm, the at least one wall preventing rotation of the bracket relative to the distal end portion of the A-arm.

In some embodiments, the at least one wall comprises first and second walls. Placing the at least one wall of the bracket adjacent to at least one of the front and the rear of the distal end portion of the A-arm comprises: placing the first wall adjacent to the front of the distal end portion of the A-arm; and placing the second wall adjacent to the rear of the distal end portion of the A-arm.

In some embodiments, the at least one wall is defined by at least one protrusion of the bracket.

In some embodiments, the method further comprises mounting at least one spacer to a rack of a rack and pinion assembly of a steering system of the vehicle for limiting a steering angle of the track assembly.

According to another aspect of the present technology, there is provided a bracket for fastening an end portion of an anti-rotation device of a track assembly to an end portion of an A-arm of a vehicle. The bracket has a bracket body defining: at least one first bracket aperture for receiving at least one fastener for fastening the bracket body to the end portion of the A-arm; and a second bracket aperture for receiving another fastener for fastening the bracket body to the end portion of the anti-rotation device. The bracket body has an A-arm abutting surface. The A-arm abutting surface abuts the end portion of the A-arm when the bracket is fastened to end portion of the A-arm. The at least one first bracket aperture is defined in the A-arm abutting surface. The second bracket aperture is defined in the bracket body at a location spaced from the A-arm abutting surface. The bracket also has at least one protrusion protruding from the bracket body adjacent to the A-arm abutting surface. The at least one protrusion defines at least one wall being adjacent to at least one of a front and a rear of the distal end portion of the A-arm when the bracket is fastened to end portion of the A-arm for preventing rotation of the bracket relative to the distal end portion of the A-arm.

In some embodiments, the at least one first bracket aperture is two first bracket apertures.

In some embodiments, a central axis of the at least one first bracket aperture is parallel to a central axis of the second bracket aperture.

In some embodiments, the at least one protrusion comprises a first protrusion defining a first wall and a second protrusion defining a second wall. When the bracket is fastened to end portion of the A-arm: the first wall is adjacent to the front of the distal end portion of the A-arm; and the second wall is adjacent to the rear of the distal end portion of the A-arm.

According to another aspect of the present technology, there is provided a suspension and track assembly for a vehicle having a suspension assembly and a track assembly. The suspension assembly has: an upper A-arm; a shock absorber assembly operatively connected to the upper A-arm; and a lower A-arm, a distal end of the lower A-arm defining a fastener aperture. The track assembly has: a frame pivotally connected to a distal end of the upper A-arm and the distal end of the lower A-arm; a plurality of wheels connected to the frame; an endless track disposed around the frame and supported by the plurality of wheels; an anti-rotation device connected to the frame; and a fastener inserted through the fastener aperture and fastening an end portion of the anti-rotation device to the distal end portion of the A-arm.

In some embodiments, a longitudinal axis of the fastener passes through the distal end portion of the anti-rotation device.

In some embodiments, the fastener is a first fastener. The track assembly also has: a bracket defining first and second bracket aperture, the first fastener being inserted through the first bracket aperture and fastening the bracket to the distal end portion of the A-arm; and a second fastener inserted through the second bracket aperture and fastening the bracket to the end portion of the anti-rotation device.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

It must be noted that, as used in this specification and the appended claims, the singular form "a", "an" and "the" include plural referents unless the context clearly dictates otherwise.

For purposes of the present application, terms related to spatial orientation when referring to a vehicle and components in relation to the vehicle, such as "vertical", "horizontal", "forwardly", "rearwardly", "left", "right", "above" and "below", are as they would be understood by a driver of the vehicle sitting thereon in an upright driving position, with the vehicle steered straight-ahead and being at rest on flat, level ground.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of embodiments of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
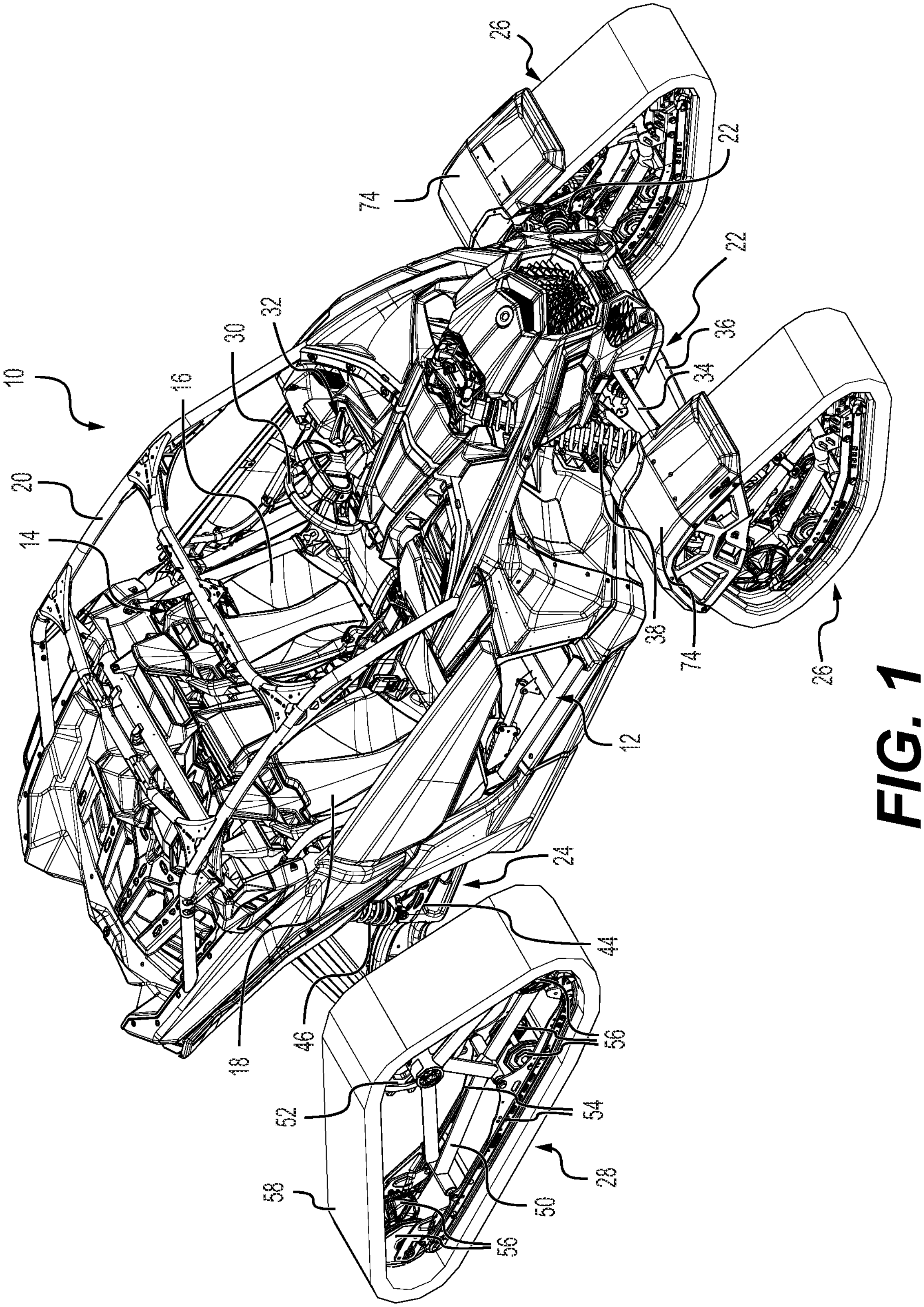
FIG. 1 is a perspective view taken from a front, right side of a side-by-side off-road vehicle provided with four track assemblies.

The present disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of “including”, “comprising”, or “having”, “containing”, “involving” and variations thereof herein, is meant to encompass the items listed thereafter as well as, optionally, additional items. In the following description, the same numerical references refer to similar elements.

The present technology will be described with reference to side-by-side off-road vehicles (SSVs). It is contemplated that at least some aspects of the present technology could be applied to all-terrain vehicles (ATVs) and similar vehicles. Furthermore, although the present technology will be described with respect to vehicles originally provided with wheels which are replaced by track assemblies, it is contemplated that aspects of the present technology could be applied to vehicles originally provided with track assemblies.

The general features of an off-road vehicle 10, specifically a side-by-side vehicle (SSV) 10, will be described with respect to FIG. 1. The vehicle 10 has a frame 12. The frame 12 defines a central cockpit area 14 inside which are disposed a driver seat 16 and a passenger seat 18. In the present embodiment, the driver seat 16 is disposed on the left side of the vehicle 10 and the passenger seat 18 is disposed on the right side of the vehicle 10. However, it is contemplated that the driver seat 16 could be disposed on the right side of the vehicle 10 and that the passenger seat 18 could be disposed on the left side of the vehicle 10. It is also contemplated that the vehicle 10 could include a single seat for the driver, or a larger number of seats, or a bench accommodating the driver and at least one passenger. The vehicle 10 also includes a roll cage 20 connected to the frame 12 and extending at least partially over the seats 16, 18.

The vehicle 10 includes a pair of front suspension assemblies 22 and pair of rear suspension assemblies 24 (only one of which is shown) that are connected to the frame 12. The vehicle 10 was originally provided with front and rear wheels operatively connected to the front and rear suspension assemblies 22, 24 respectively. As can be seen in FIG. 1, the front and rear wheels have been removed and replaced with front and rear track assemblies 26, 28 respectively. Ground-engaging members of the type of the front and rear track assemblies 26, 28 are sometimes referred to as track kits as they are often provided in kits sold separately from the vehicle that the user installs to replace the wheels. However, it is contemplated that the vehicle 10 could be provided with the track assemblies 26, 28 originally installed at the factory or the vehicle dealership. The front and rear track assemblies 26, 28 will be described in more detail below.

The vehicle 10 includes a steering wheel 30 operatively connected to the front track assemblies 26 for controlling an angle of the front track assemblies. The driver operates the steering wheel 30 from the driver seat 16. The steering wheel 30 is disposed in front of the driver seat 16. The vehicle 10 also includes a dashboard 32 disposed forward of the seats 16, 18. A throttle operator in the form of a throttle pedal (not shown) is disposed over the floor of the cockpit area 14 below the steering wheel 30 and in front of the driver seat 16.

A motor (not shown) is connected to the frame 12 in a rear portion of the vehicle 10. In the present embodiment, the motor is an internal combustion engine but the present technology is not so limited. It is contemplated that the engine could be replaced by a hybrid or electric motor in some embodiments. The vehicle 10 includes an engine control module (ECM) (not shown) for monitoring and controlling various operations of the engine. The motor is connected to a transmission, specifically a continuously variable transmission (CVT) (not shown). The CVT is operatively connected to connected to the front and rear track assemblies 26, 28 to propel the vehicle 10. It is contemplated that the vehicle 10 could having another transmission type.

Each front suspension assembly 22 includes an upper A-arm 34, a lower A-arm 36, and a front shock absorber assembly 38. Each front shock absorber assembly 38 is pivotally connected between its corresponding upper A-arm 34 and the frame 12. The proximal ends of the upper and lower A-arms 34, 36 are pivotably connected to the frame 12. A knuckle 40 (FIG. 5) is pivotally to the distal ends of the upper and lower A-arms 34, 36. The knuckles 40 rotationally support the front wheel hubs 42. The front track assemblies 26 are connected to the front wheel hubs 42 as will be described in more detail below. The front suspension assemblies 22 will be described in more detail below.

Each rear suspension assembly 24 comprises a swing arm 44 and a rear shock absorber assembly 46. Each rear shock absorber assembly 46 is pivotally connected between its corresponding swing arm 44 and the frame 12. Each swing arm 44 has one end pivotably connected to the frame 12 about a pivot axis extending generally laterally, and an opposite end rotationally supporting a rear wheel hub (not shown). The rear track assemblies 28 are connected to the rear wheel hubs. The swing arms 44 are connected at mid-length to a torsion bar (not shown) by links.

A rear, right track assembly 28 of the vehicle 10 will now be described in more detail. A rear, left track assembly 28 of the vehicle 10 is a mirror image of the rear, right track assembly 28 and as such will not be described herein in detail.

The rear track assembly 28 has a frame 50. A drive sprocket 52 is rotatably mounted to an upper end of the frame 50. The drive sprocket 52 defines four apertures (not shown). The drive sprocket 52 is disposed on the rear wheel hub such that studs extending from the rear wheel hub are received in the apertures. Nuts are then fastened onto the studs to fasten the drive sprocket 52 to the rear wheel hub such that the drive sprocket 52 can be driven. Two slide rails 54 are connected to the lower end of the frame 50. Idler wheels 56 are rotationally connected to the lower end of the frame 50 or to the slide rails 54. An endless track 58 is disposed around the frame 50, the drive sprocket 52, the idler wheels 56, and the slide rails 54. Although not illustrated, the endless track 58 has a plurality of external lugs on an outer side thereof to provide traction. The endless track 58 defines a row of apertures (not shown) along a center thereof. The apertures are engaged by teeth of the drive sprocket 52 as it turns. As a result, the endless track 58 turns around the frame 50, the drive sprocket 52, the idler wheels 56, and the slide rails 54, which propels the vehicle 10. It is contemplated that in addition to or instead of the apertures, the endless track 58 could be provided with rows of internal lugs to be engaged by axially projecting teeth of an alternative embodiment of the drive sprocket 52.

To replace the rear wheels of the vehicle 10 with the rear track assemblies 28, the rear of the vehicle 10 is first raised, with a jack or a lift for example, such that the rear wheels no longer contact the ground. The rear wheels are unfastened from their corresponding rear wheel hubs and removed. The rear track assemblies 28 are then positioned over the rear wheel hubs and the drive sprockets 52 are fastened to their corresponding rear wheel hubs by studs of the rear hubs inserted through the apertures in the drive sprockets 52 and by nuts as described above. An anti-rotation device (sometimes referred to as a “rotation limiting device”, not shown) is connected between the frame 50 of each rear track assembly 28 and the frame 12 of the vehicle 10. The anti-rotation devices limit the rotation of the rear track assemblies 28 about the rotation axes of the drive sprocket 52.

Figure 2:
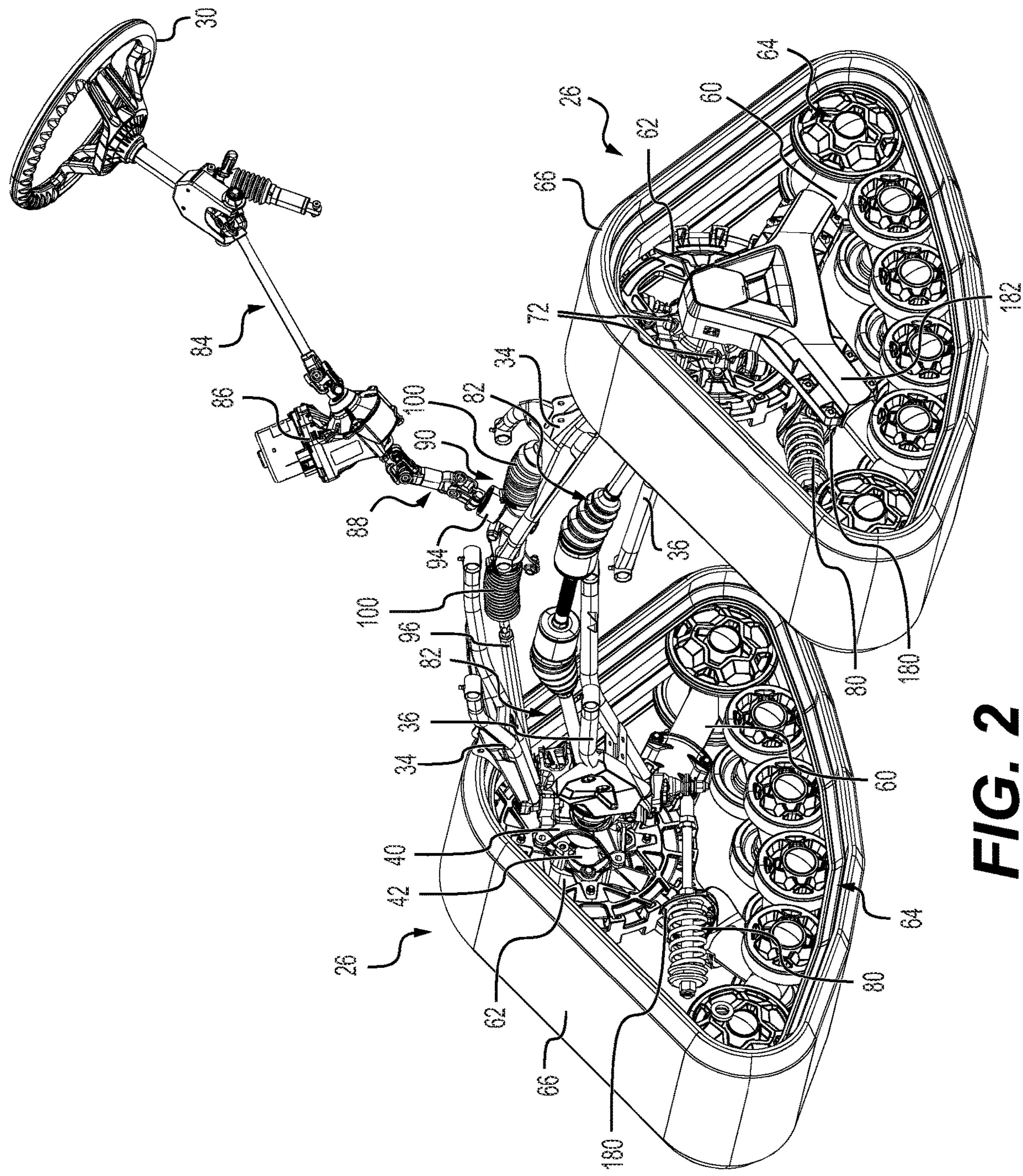
FIG. 2 is a perspective view taken from a front, left side of a steering system, front track assemblies, and other associated components of the vehicle of FIG. 1.
Figure 5:
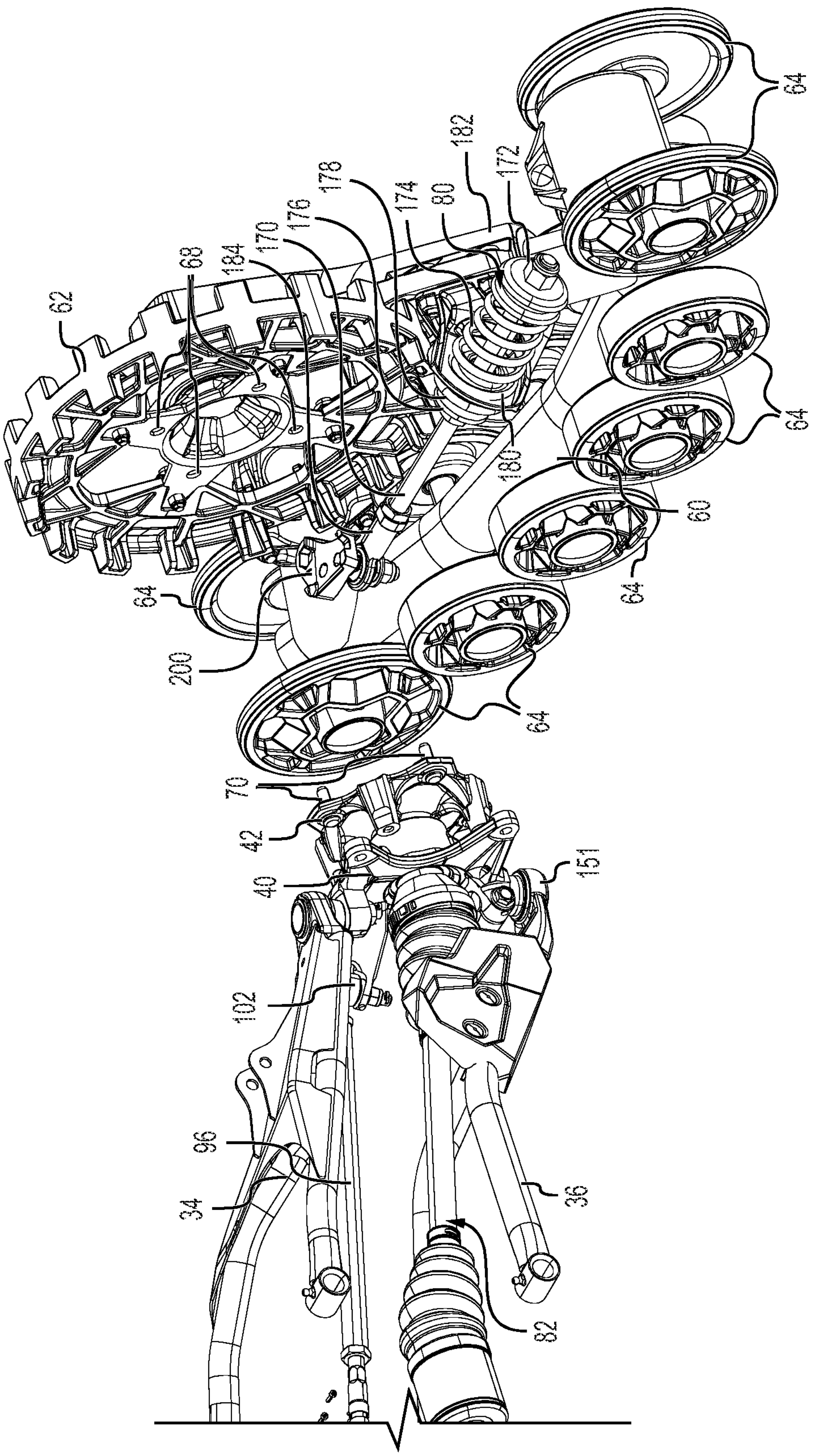
FIG. 5 is a perspective view of a front left track assembly and portion of a front left suspension assembly of the vehicle of FIG. 1; with the track of the track assembly being removed and with the track assembly being disconnected from the suspension assembly.

Turning now to FIGS. 2 and 5, the front track assemblies 26 of the vehicle 10 will be described in more detail. As can be seen by comparing the front right track assembly 26 to the rear right track assembly 28, the front track assembly 26 is shorter in length than the rear track assembly 28. Also, the lower front and rear portions of the front track assemblies 26 extend diagonally upward from a central flat portion, whereas the lower portion of the rear track assemblies 28 are generally flat. Both of these features (i.e. shorter length and diagonally upward lower portions) facilitate steering of the front track assemblies 26.

Each front track assembly 26 has a frame 60, a drive sprocket 62, idler wheels 64 and an endless track 66. The drive sprocket 62 is rotatably mounted to an upper end of the frame 60. The drive sprocket 62 defines four apertures 68 (FIG. 5). The drive sprocket 62 is disposed on its corresponding front wheel hub 42 such that studs 70 extending from the front wheel hub 42 are received in the apertures. Nuts 72 (FIG. 2) are then fastened onto the studs 70 to fasten the drive sprocket 62 to the front wheel hub 42 such that the drive sprocket 62 can be driven. The idler wheels 64 are rotationally connected to the lower end of the frame 60. The endless track 66 is disposed around the frame 60, the drive sprocket 62, and the idler wheels 64. Although not illustrated, the endless track 66 has a plurality of external lugs on an outer side thereof to provide traction. The endless track 66 defines two rows of internal lugs (not shown). The internal lugs are engaged by teeth of the drive sprocket 62 as it turns. As a result, the endless track 66 turns around the frame 60, the drive sprocket 62, and the idler wheels 64, which propels the vehicle 10. It is contemplated that in addition to or instead of the internal lugs, the endless track 66 could be provided with a row of apertures to be engaged by radially projecting teeth of an alternative embodiment of the drive sprocket 62. A fender 74 is provided over a top portion of each track assembly 26. It is contemplated that the fenders 74 could be omitted.

To replace the front wheels of the vehicle 10 with the front track assemblies 26, the front of the vehicle 10 is first raised, with a jack or a lift for example, such that the front wheels no longer contact the ground. The front wheels are unfastened from their corresponding front wheel hubs 42 and removed. The front track assemblies 26 are then positioned over the front wheel hubs 42 and the drive sprockets 62 are fastened to their corresponding front wheel hubs 42 by the studs 70 inserted through the apertures 68 in the drive sprockets 62 and by the nuts 72 as described above. Each front track assembly 26 also has an anti-rotation device 80 (sometimes referred to as a “rotation limiting device”) connected between its frame 60 and the its corresponding front suspension assembly 22 as will be described in more detail below. The anti-rotation devices limit the rotation of the front track assemblies 26 about the rotation axes of the drive sprockets 62. Additional steps for replacing the front wheels of the vehicle 10 with the front track assemblies 26 will be described below.

The track assemblies 26, 28 are examples of track assemblies that can be provided on the vehicle 10. It is contemplated that the vehicle 10 could be provided with different embodiments of front and rear track assemblies.

Figure 3:
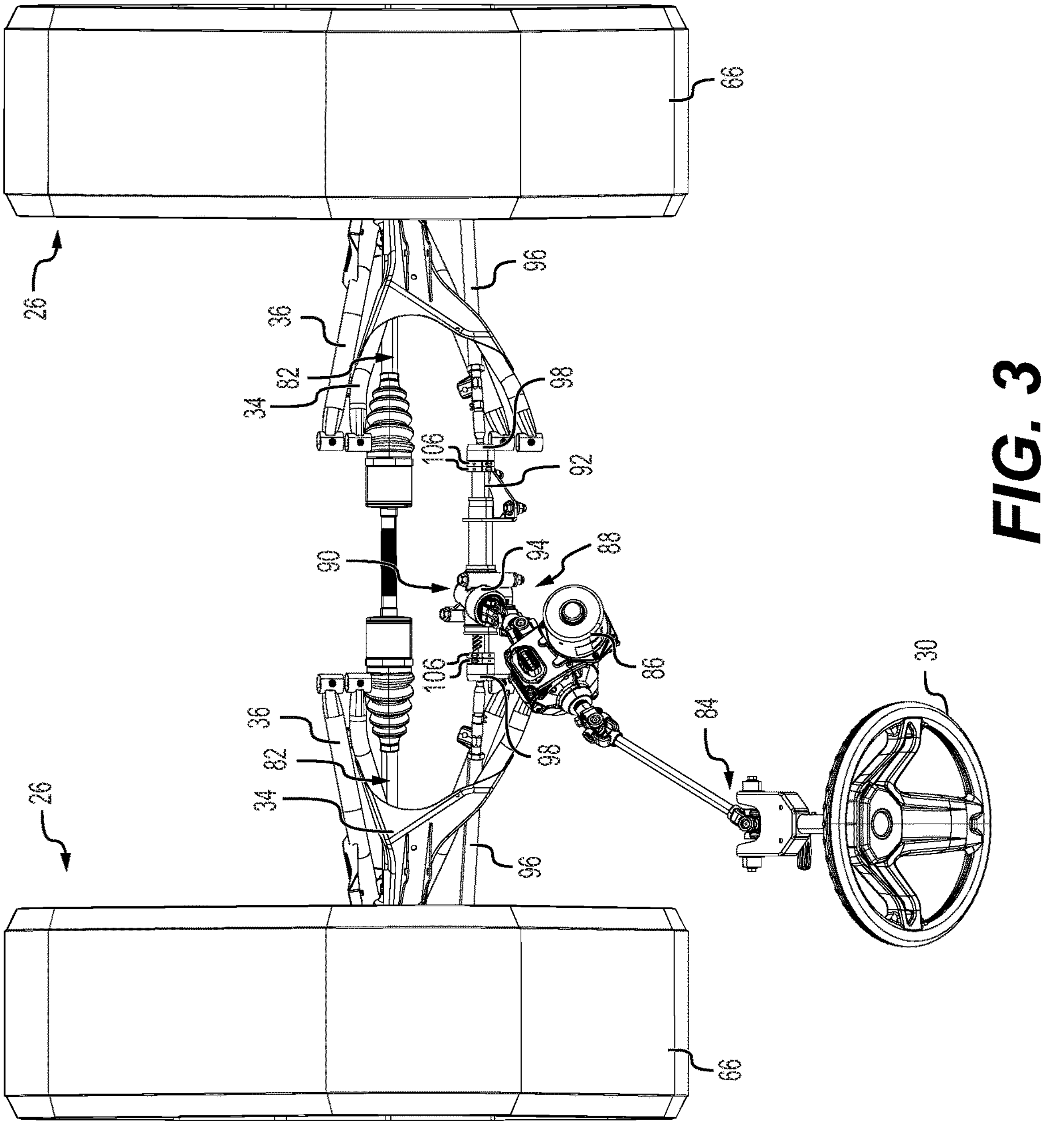
FIG. 3 is a top plan view of the components of FIG. 2, with protective boots of a rack and pinion assembly of the steering system.
Figure 4:
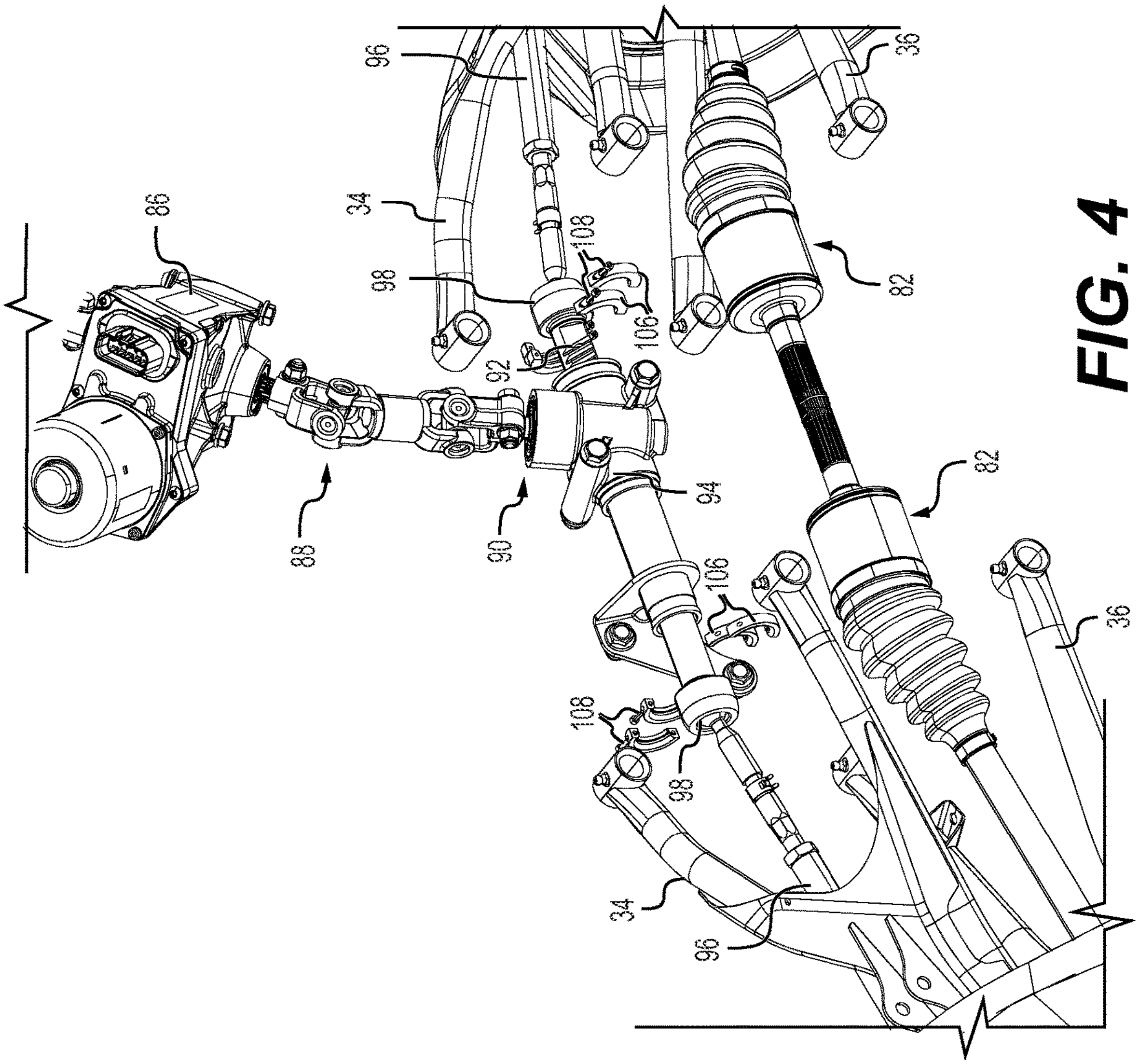
FIG. 4 is a close-up perspective view of the rack and pinion assembly and surrounding components of FIG. 3, with spacers shown in an exploded configuration.

With reference to FIGS. 2 to 4, to drive the front drive sprockets 62 of the front track assemblies 26, the CVT of the vehicle 10 drives a front differential (not shown). The front differential drives left and right front half-shaft assemblies 82. Each half-shaft assembly 82 is connected to and drives a corresponding wheel shaft (not shown) rotationally supported by bearings (not shown) in its corresponding knuckle 40. Each wheel shaft is connected to and drives its corresponding wheel hub 42, which in turn drives its corresponding front drive sprocket 62.

With continued reference to FIGS. 2 to 4, the steering system of the vehicle 10 will now be described in more details. The steering wheel 30 is connected to and turns an upper steering column assembly 84. The upper steering column assembly 84 drives a power steering unit 86 which provides steering assistance. It is contemplated that is some embodiments the power steering unit 86 could be omitted. The power steering unit 86 drives a lower steering column assembly 88. The lower steering column assembly 88 drives a rack and pinion assembly 90. The rack and pinion assembly 90 includes a pinion (not shown) that is turned by the lower steering column assembly 88 and a rack 92 engaged by the pinion. Rotation of the pinion translates the rack left or right depending on the direction of rotation of the pinion, and therefore of the steering wheel 30. The rack and pinion assembly 90 has a housing 94 that houses the pinion and through which the rack 92 extends laterally. The ends of the rack 92 are connected to left and right steering rods 96 by ball joints 98 (FIG. 3). The ends of the rack 92, the ball joints 98 and the proximal ends of the steering rods 96 are covered by flexible boots 100 (FIG. 2). The distal ends of the steering rods 96 are connected by ball joints 102 (see FIG. 6 for the right ball joint 102) to the knuckles 42. Translation of the rack 92 causes translation of the steering rods 96, which causes rotation of the knuckles 42 about their respective steering axes 104 (see FIG. 6 for the right steering axis 104). Rotation of the knuckles 42 about their steering axes 104 causes a corresponding rotation of the front track assemblies 26 about the steering axes 104.

In order to prevent contact between the front track assemblies 26 and the body or other components of the vehicle 10 by steering the front track assemblies 26 too far, spacers 106 are to be installed, when installing the front track assemblies 26. As can be seen in FIGS. 3 and 4, the spacers 106 are mounted on the rack 92. More specifically, the spacers 106 are mounted on each end of the rack adjacent to the ball joints 98, between the ball joints and the housing 94 of the rack and pinion assembly 90. As a result, the spacers 106 limit the amount of travel of the rack 92, and therefore limit the steering angle of the track assemblies 26.

In the present embodiment, two spacers 106 are mounted on each end of the rack 92. It is contemplated that only one or more than two spacers 106 could be provided depending on the desired amount of steering limitation. It is also contemplated that instead of providing multiple spacers 106 of the same width on each end of the rack 92, a single spacer having a width corresponding to the width of the multiple spacers 106 could be provided on each end of the rack 92. To install the spacers 106, the boots 100 first have to be removed. In the present embodiment, each spacer 106 is a ring made of two halves, as best seen FIG. 3. The halves of each ring are brought together around the rack 92 at the desired location and are fastened to each other using fasteners 108 to form the spacer 106. Once all the spacers 106 are mounted to the rack 92, the boots are reinstalled over the ends of the rack 92, the ball joints 98, the proximal ends of the steering rods 96 and the spacers 106.

Figure 6:
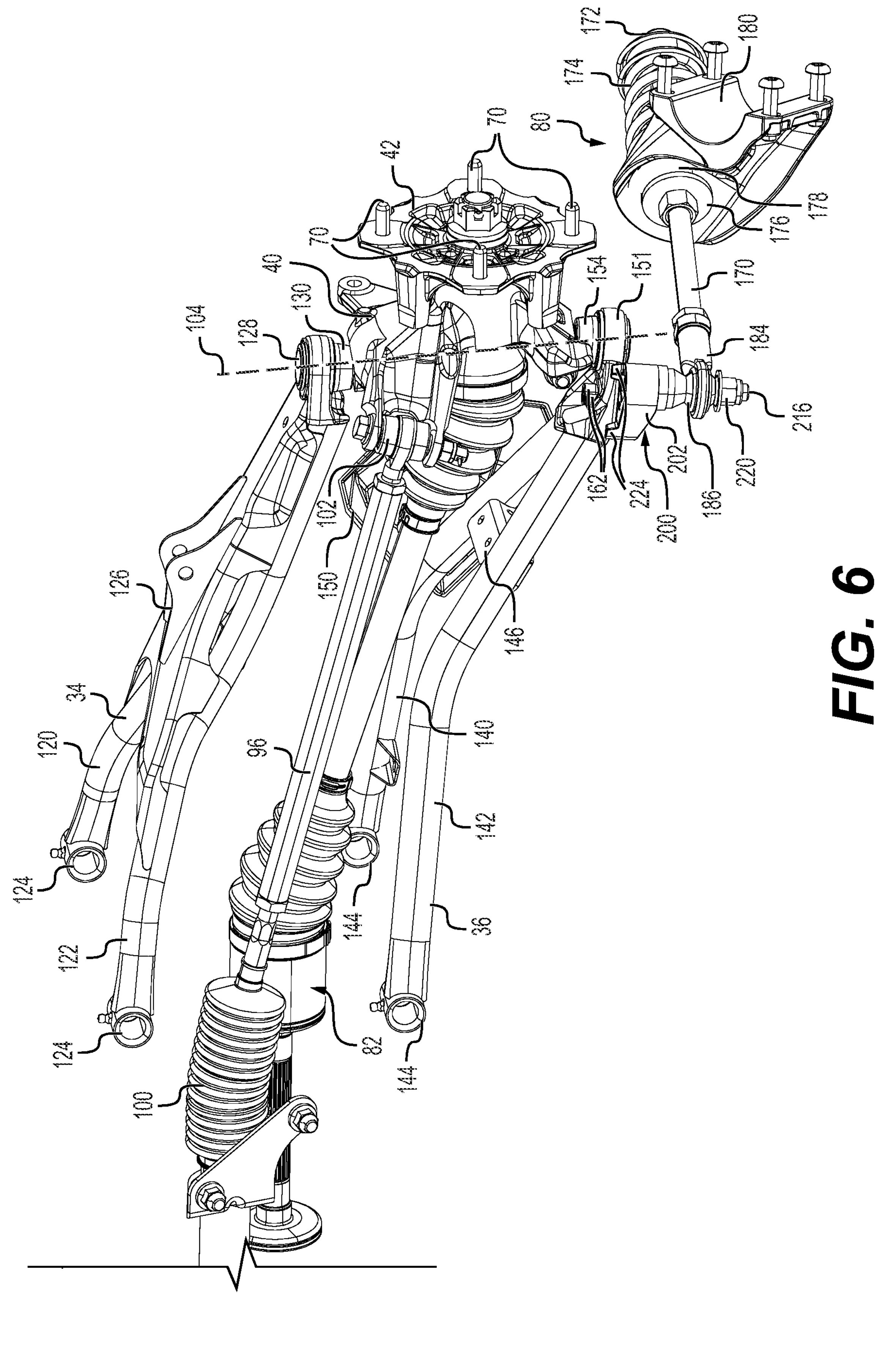
FIG. 6 is a perspective view taken from a rear, right side of part of the front right suspension assembly, drive components, and steering components, and of a an anti-rotation device of a front right track assembly of the vehicle of FIG. 1.
Figure 7:
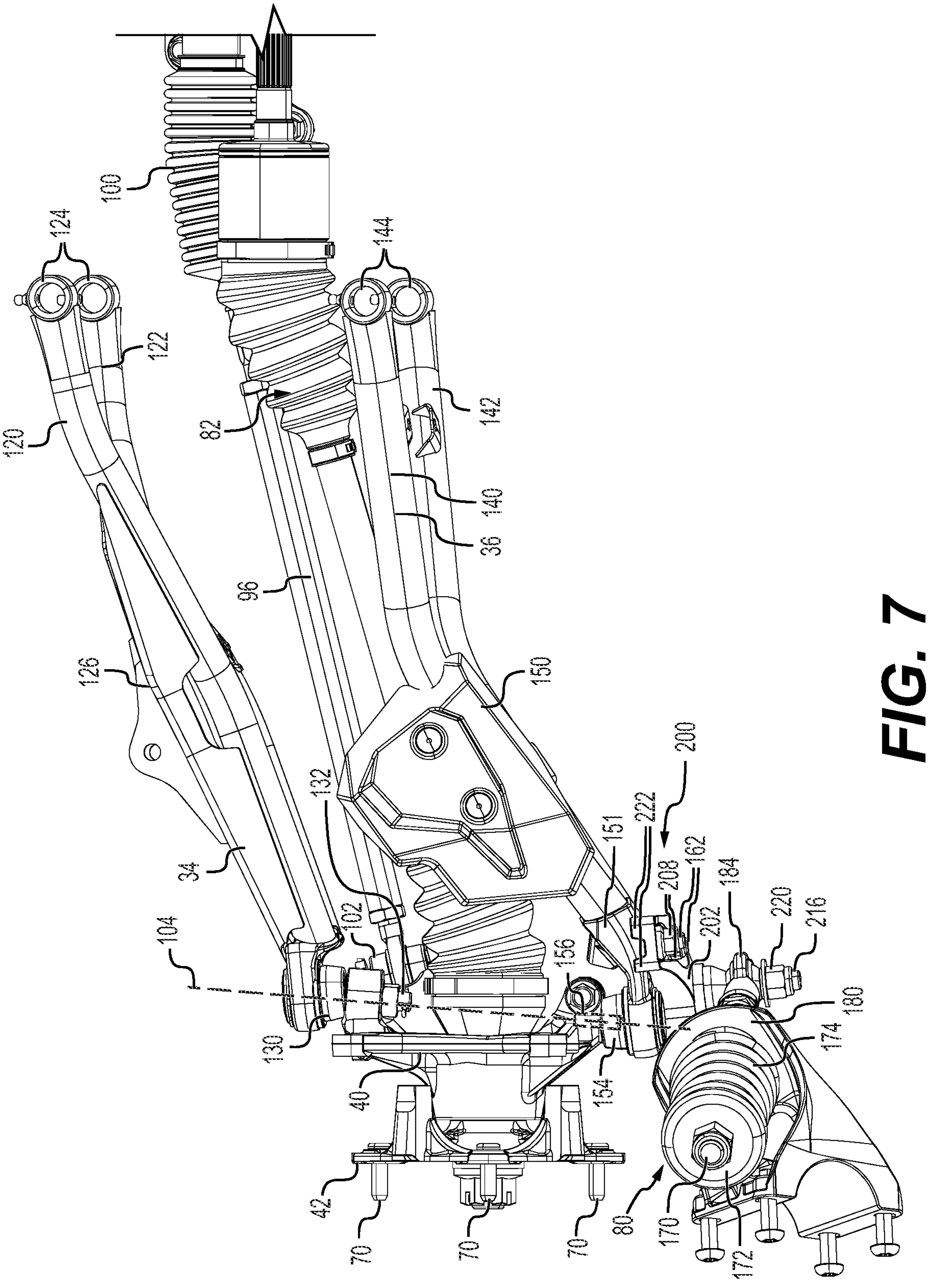
FIG. 7 is a front elevation view of the components of FIG. 6.
Figure 8:
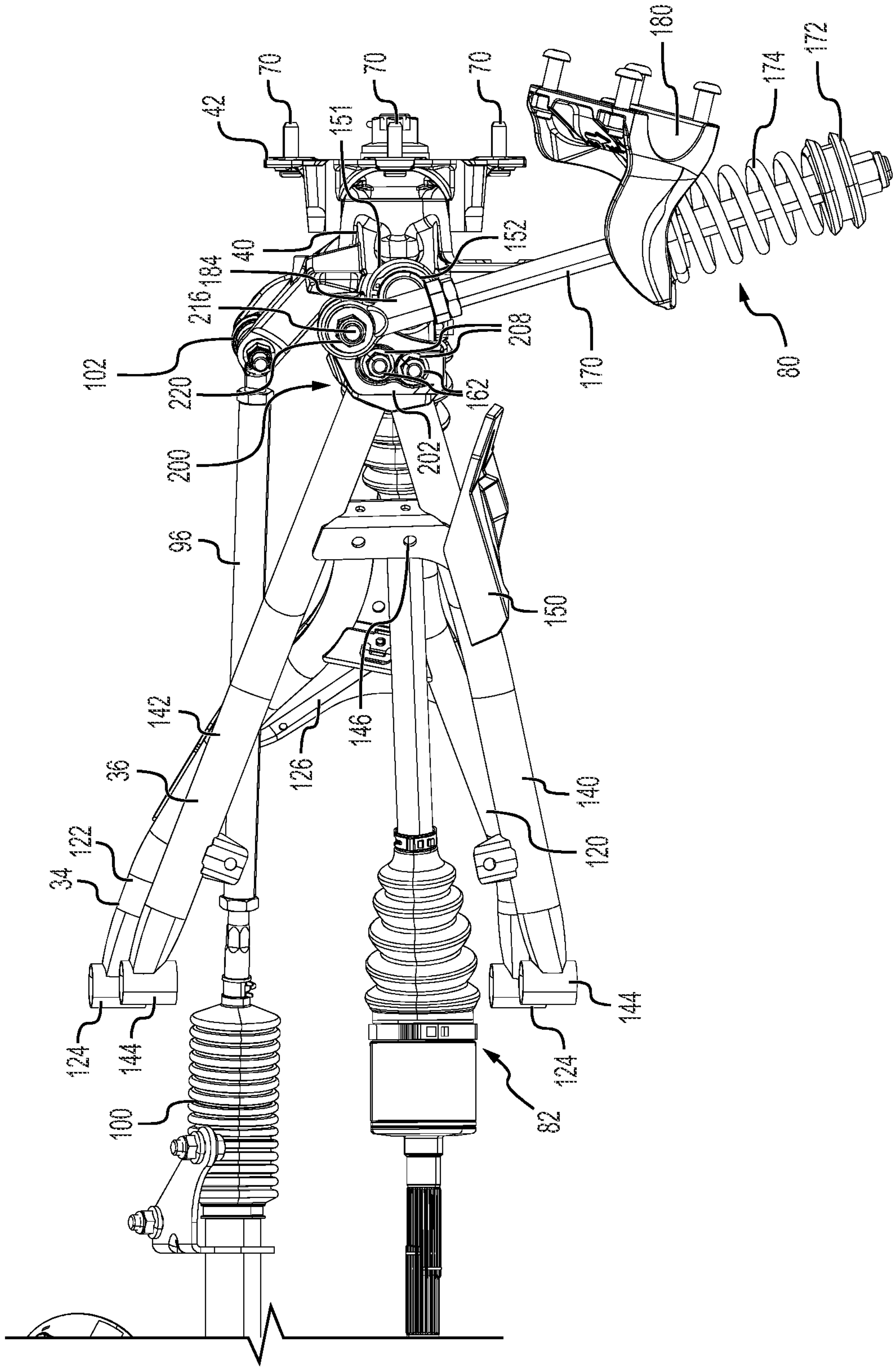
FIG. 8 is a bottom plan view of the components of FIG. 7.

Turning now to FIGS. 6 to 8, the front right suspension assembly 22 will be described in more detail. As the front left suspension assembly 22 is a mirror image of the front right suspension assembly 22, it will not be described in detail herein. The front suspension assembly 22 and its corresponding front track assembly 26 together define a suspension and track assembly.

The upper A-arm 34 has a front member 120 and a rear member 122 that converge toward each other. Sleeves 124 are connected to the proximal ends of the front and rear members 120, 122. The sleeves 124 are used to pivotally connect the proximal end of the upper A-arm 34 to the frame 12 of the vehicle 10. A bracket 126 is connected to a top of the front and rear members 120, 122. The lower end of the front shock absorber assembly 38 is pivotally connected to the bracket 126. The distal end portion of the upper A-arm 34 defines an aperture 128 (FIG. 6). A ball joint 130 is received in the aperture 128. A knuckle fastener 132 (FIG. 7) connected to the ball joint 130 is inserted through the aperture 128 and is connected to an upper portion of the knuckle 40, thereby pivotally connecting the knuckle 40 to the distal end portion of the upper A-arm 34.

Figure 9:
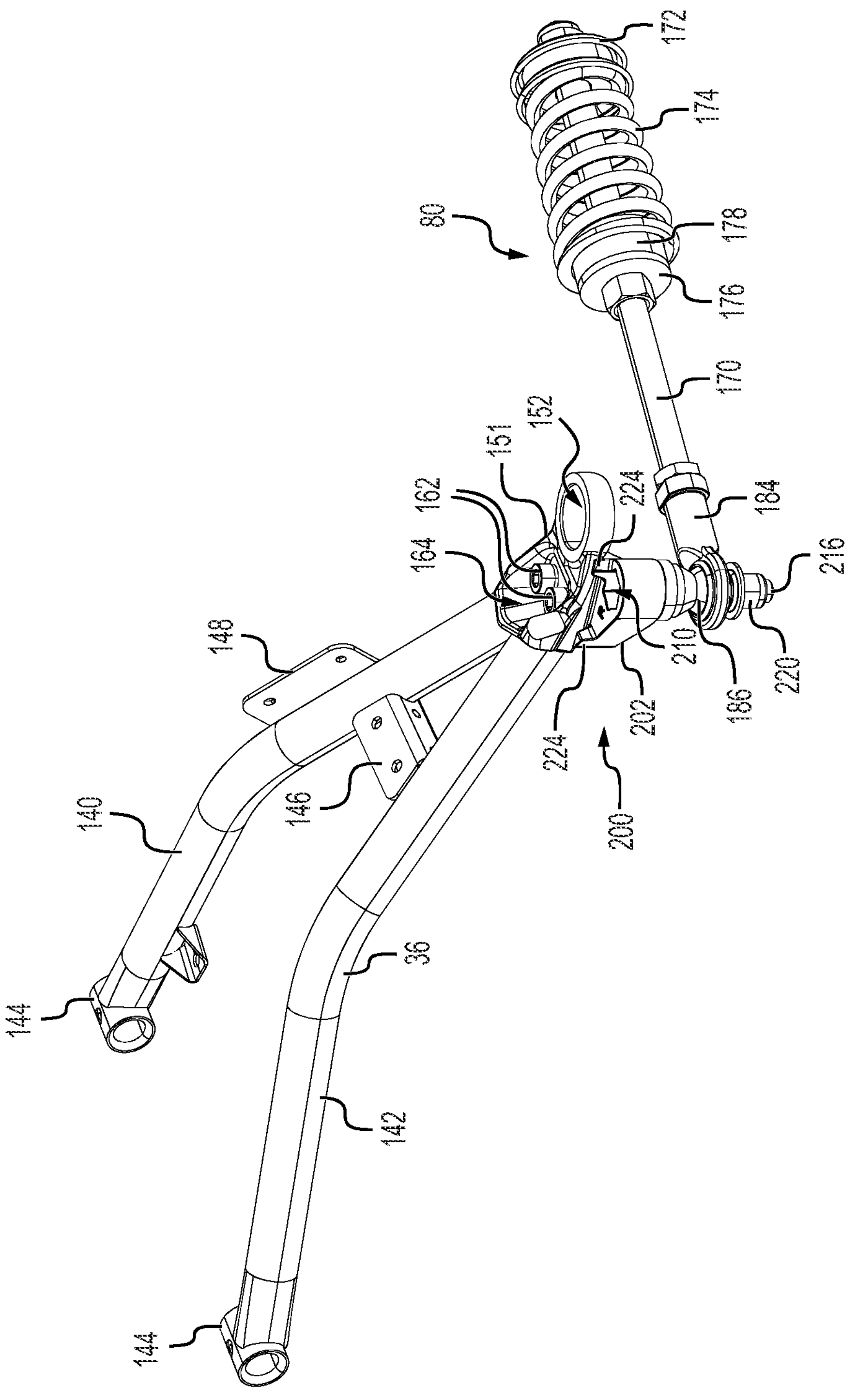
FIG. 9 is a perspective view taken from a rear, right side of a lower A-arm of the front right suspension assembly and of the anti-rotation device of the front right track assembly of the vehicle of FIG. 1.

The lower A-arm 36 has a front member 140 and a rear member 142 that converge toward each other. Sleeves 144 are connected to the proximal ends of the front and rear members 140, 142. The sleeves 144 are used to pivotally connect the proximal end of the lower A-arm 36 to the frame 12 of the vehicle 10. A bracket 146 is connected longitudinally between the front and rear members 140, 142. Another bracket 148 (FIG. 9) is connected to a front of the front member 140. A deflector 150 is connected to the lower A-arm 36 via the bracket 148. The distal end portion 151 of the lower A-arm 36 defines an aperture 152 (FIG. 9). In the present embodiment, the distal end portion 151 of the lower A-arm 36 corresponds to the portion of the lower A-arm 36 that is connected to the distal ends of the front and rear members 140, 142. A ball joint 154 is received in the aperture 152. A knuckle fastener 156 (shown in dotted lines in FIG. 7) connected to the ball joint 154 is inserted through the aperture 152 and is connected to a lower portion of the knuckle 40, thereby pivotally connecting the knuckle 40 to the distal end portion 151 of the lower A-arm 36.

Figure 10:
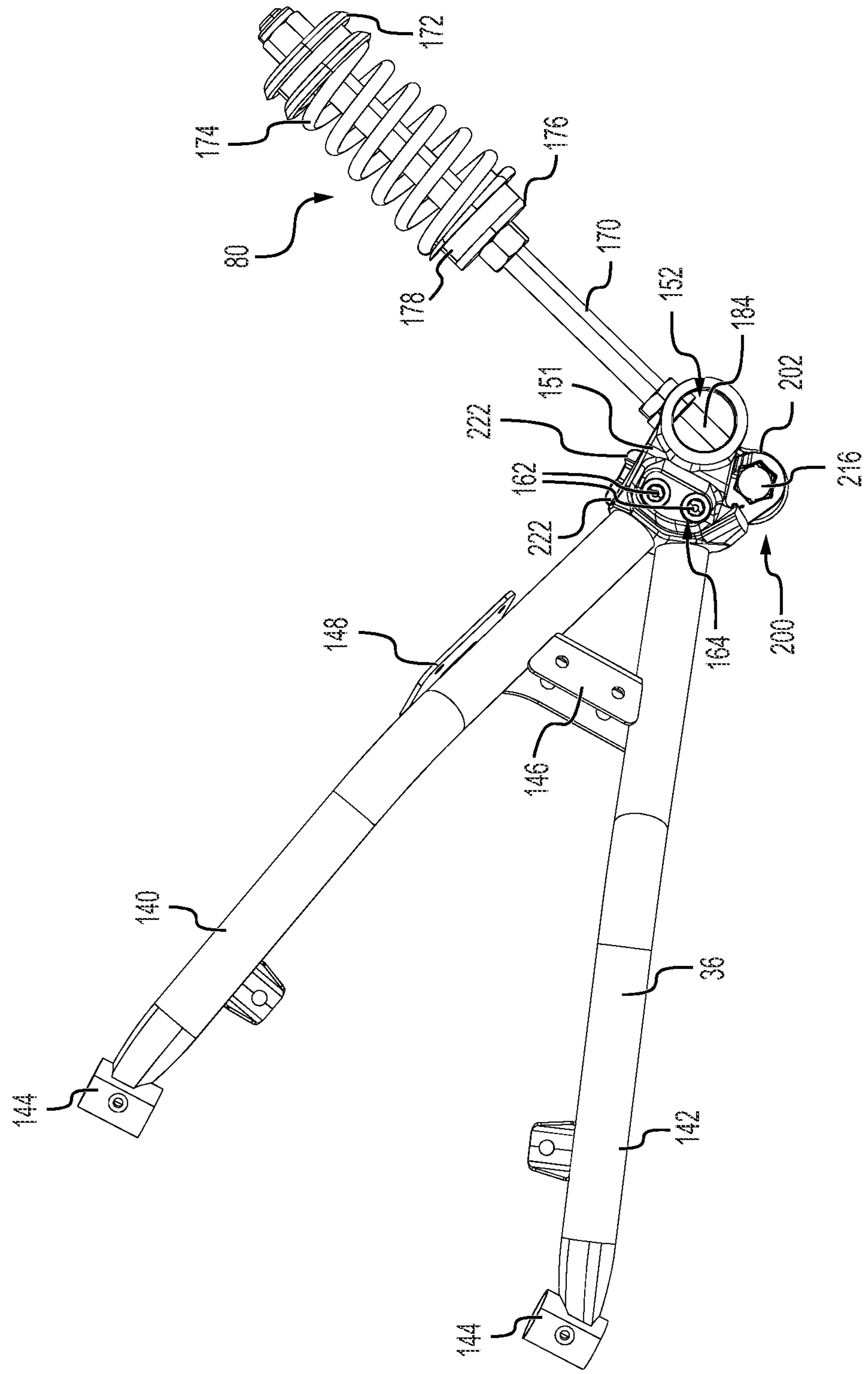
FIG. 10 is a bottom plan view of the components of FIG. 9.
Figure 11:
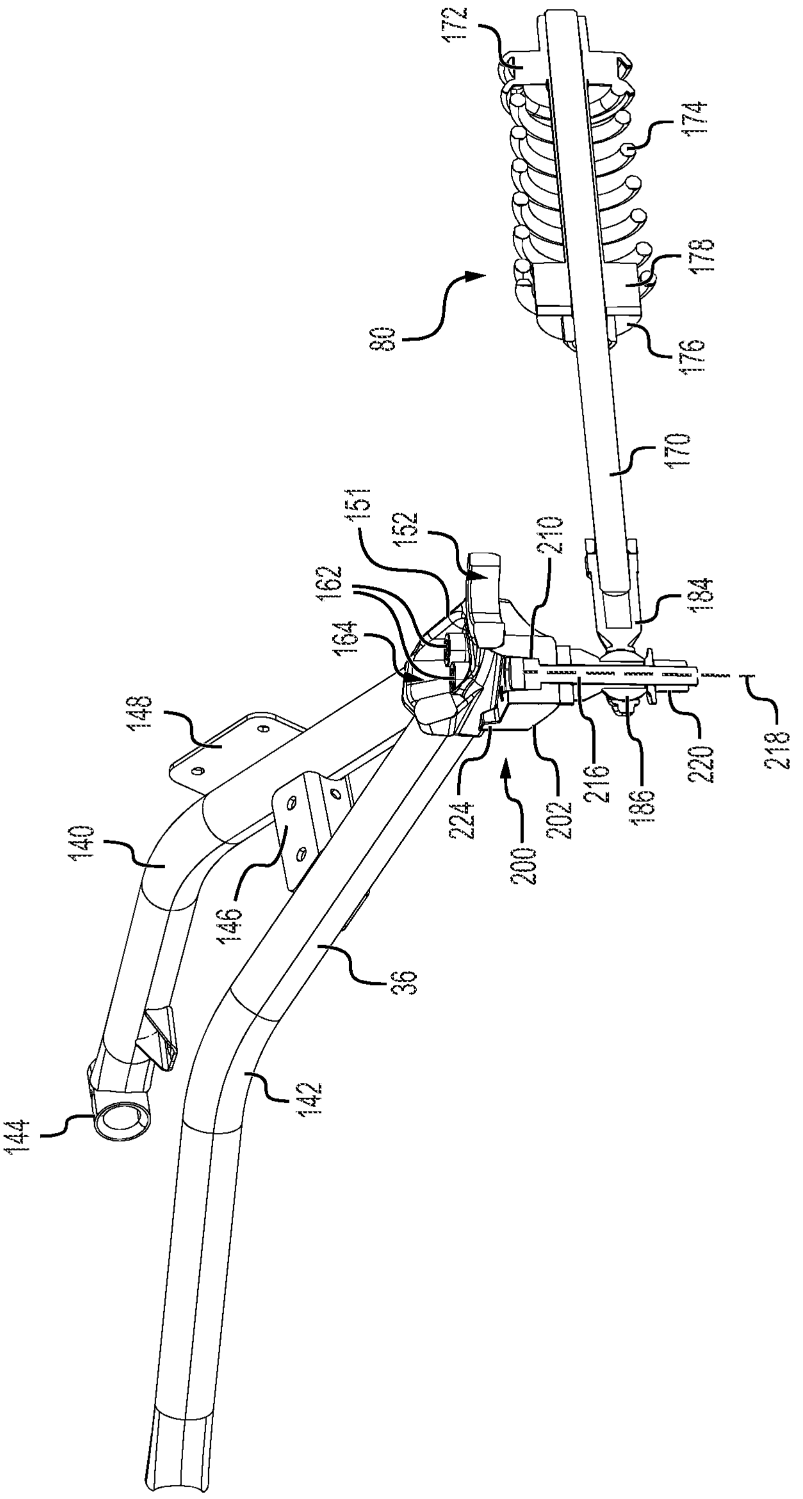
FIG. 11 is a cross-section of the components of FIG. 9 taken through a longitudinal axis of a fastener connecting the anti-rotation device to a bracket, the bracket connecting the anti-rotation device to the A-arm.
Figure 12:
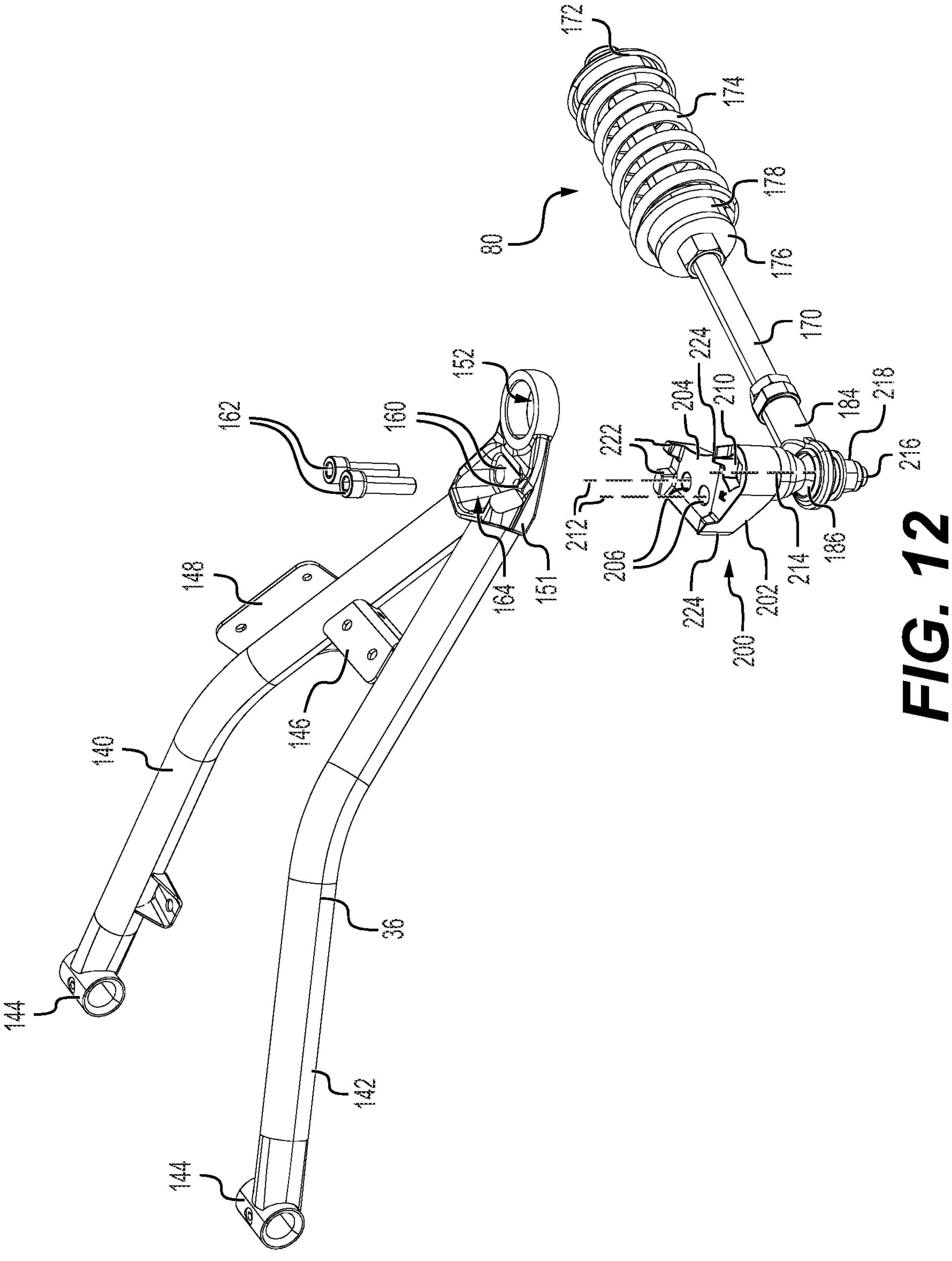
FIG. 12 is a partially exploded view of the components of FIG. 9.

With reference to FIGS. 9 to 12, the lower A-arm 36 also defines two fastener apertures 160 in its distal end portion 151 that receive two threaded fasteners 162. In the present embodiment, the threaded fasteners 162 are socket head cap screws, but other types of fasteners are contemplated. The heads of the threaded fasteners 162 inserted through the fastener apertures 160 are disposed in a recess 164 defined in the distal end portion 151 of the lower A-arm 36. The fastener apertures 160 are sized to receive the fasteners 162 and are drilled or otherwise machined in the distal end portion 151 of the lower A-arm 36. As can be seen in FIG. 12, one of the fastener apertures 160 is disposed forward of the other fastener aperture 160. As can also be seen in FIG. 12, both fastener apertures 160 are disposed laterally between the aperture 152 and the proximal end of the lower A-arm 36. As such, the centers of the fastener apertures 160 are disposed laterally between the center of the aperture 152 and the proximal end of the lower A-arm 36. It is contemplated that in some embodiments, the lower A-arm 36 could define a single fastener aperture 160 or more than two fastener apertures 160, in which case there would be a corresponding number of threaded fasteners 162.

With reference to FIGS. 6 to 12, the anti-rotation device 80 will be described in more detail. The anti-rotation device 80 has a stabilizing rod 170. A front cap 172 is fastened to a front end of the stabilizing rod 170. A coil spring 174 is disposed around the stabilizing rod 170 and abuts a rear side of the front cap 172. A plate 176 is fastened to the stabilizing rod 170 near or at a center thereof. An elastomeric member 178 is connected to a front side of the plate 176. In the present embodiment, the elastomeric member 178 is a cylindrical member made of vulcanized rubber, but other types of elastomeric ember 178 are contemplated. A bracket 180 (shown in FIGS. 5 to 8) is disposed between the rear end of the coil spring 174 and a front side of the elastomeric member 178. The bracket 180 is fastened to another bracket 182 (see FIGS. 2 and 5 showing the bracket 182 of the front left track assembly 26). The brackets 180, 182 are disposed around a front portion of the frame 60 of the front suspension assembly 26 to connect the anti-rotation device 80 to the frame 60 of the front suspension assembly 26. A tie rod end 184 is connected to the rear end of the stabilizing rod 170. As best seen in FIG. 11, the tie rod end 184 includes a ball joint 186. In the present embodiment, the tie rod end 184 defines a rear end portion of the anti-rotation device 80. It is contemplated that in some embodiments, other types of anti-rotation devices 80 could be used. For example, instead of having one coil spring 174 and one elastomeric member 178, the anti-rotation device 80 could have two coil springs or two elastomeric members. Also for example, the coil spring 174 could be disposed behind the bracket 180 and the elastomeric member 178 could be disposed in front of the bracket 180.

To connect the rear end portion of the anti-rotation device 80 to the distal end portion 151 of the lower A-arm 36, a bracket 200 is provided. As best seen in FIG. 12, the bracket 200 has a generally L-shaped bracket body 202. The bracket body 202 has an A-arm abutting surface 204 that abuts a bottom of the distal end portion 151 of the lower A-arm 36. The bracket body 202 defines two bracket apertures 206 in the A-arm abutting surface 204. The bracket apertures 206 are aligned with the fastener apertures 160. As such, one of the bracket apertures 206 is disposed forward of the other bracket aperture 206. The fasteners 162 are received in the fastener apertures 160 and bracket apertures 206. Nuts 208 (FIG. 7) are fastened to the ends of the fasteners 162 protruding below the bracket body 202 thereby fastening the bracket body 202, and therefore the bracket 200, to the distal end portion 151 of the lower A-arm. It is contemplated that in embodiments having a single fastener aperture 160 or more than two fastener apertures, the bracket body 202 would have a corresponding number of bracket apertures 206 aligned with the fastener aperture(s) 160.

The bracket body 202 also defines another bracket aperture 210 at a location spaced from the A-arm abutting surface 204. As can be seen in FIG. 12, the fastener apertures 160 and the bracket apertures 206 are forward and laterally inward of the bracket aperture 210. In the present embodiment, the central axes 212 of the bracket apertures 206 are parallel to the central axis 214 of the bracket aperture 210. The upper portion of the bracket aperture 210 has an hexagonal shape. The rear end portion of the anti-rotation device 80 is fastened to the bracket 200 by a fastener 216 inserted through the bracket aperture 210 and through the ball joint 186. As such, the longitudinal axis 218 (FIG. 11) of the fastener 216 passes through the rear end portion of the anti-rotation device 80. A nut 220 is fastened to the end of the fastener 216 that extends below the tie rod end 184. As such, the anti-rotation device 80 is fastened to the distal end portion 151 of the lower A-arm 36 via the bracket 200 and the fasteners 160, 216. In the present embodiment, the fastener 216 is a bolt 216 having a hexagonal head. As the hexagonal head of the bolt 216 is received in the hexagonal portion of the bracket aperture 210, the bolt 216 cannot rotate in the aperture 210 and no tool is required to prevent the bolt 216 from rotating as the nut 220 is fastened to the fastener 216. In an alternative embodiment, it is contemplated that the fastener 216 could be a stud integrally formed with and extending from a top of the ball joint 186. In such and embodiment, the stud would be inserted through the bracket aperture 210 and the nut 220 would be fastened to a threaded portion of the stud that extends above a top of the bracket 200. As can be seen in the figures, the anti-rotation device 80 extends below the distal end portion 151 of the lower A-arm 36 and below the bracket 200.

The bracket 200 has two front protrusions 222 and two rear protrusions 224. The protrusions 222, 224 protrude from the top of the bracket body 202. The two front protrusions 222 are disposed adjacent to the front of the A-arm abutting surface 204 and the two rear protrusions 224 are disposed adjacent to the rear of the A-arm abutting surface 204 as can be seen in FIG. 12. The front protrusions 222 have rear walls that are adjacent to the front of the distal end portion 151 of the lower A-arm 36 as can be seen in FIG. 10. The rear protrusions 222 have front walls that are adjacent to the rear of the distal end portion 151 of the lower A-arm 36 as can be seen in FIG. 9. The protrusions 222, 224 prevent rotation about a vertical axis of the bracket 200 relative to the distal end portion 151 of the lower A-arm 36. It is contemplated that the bracket 200 could have more or less protrusions 222, 224, including embodiments without protrusions 222 or without protrusions 224. It is also contemplated that in some embodiments, the protrusions 222 and 224 could be omitted. It is contemplated that instead of having walls defined by the protrusions 222, 224, the A-arm abutting surface 204 could be recessed in the bracket body 202 and the front and rear walls of the resulting recess would be the wall disposed adjacent to the front and rear of the distal end portion 151 of the lower A-arm 36 to prevent rotation of the bracket 200.

To replace the front right wheel of the vehicle 10 with the front right track assembly 26, once the drive sprocket 62 of the of the front track assembly 26 is fastened to the knuckle 40 via the wheel hub 42 as described above, the anti-rotation device 80, which is fastened to the frame 60 of the front track assembly 26, is fastened to the distal end portion 151 of the lower A-arm 36 as described below. The front left track assembly 26 is mounted to the vehicle 10 in a similar manner.

The A-arm abutting surface 204 of the bracket 202 is first abutted with the bottom of the distal end portion 151 of the lower A-arm 36 such that the fastener apertures 160 are aligned with the bracket apertures 206 and such that the distal end portion 151 of the lower A-arm 36 is disposed longitudinally between the protrusions 222 and the protrusions 224. The fasteners 162 are then inserted through the fastener apertures 160 and the bracket apertures 206 and the nuts 208 are fastened to the lower ends of the fasteners 162, thereby fastening the bracket 200 to the distal end portion 151 of the lower A-arm 36. The rear end portion of the anti-rotation device 80 is then placed under the bracket 200 such that a center of the ball joint 186 is aligned with the bracket aperture 210. The fastener 216 is then inserted in the bracket aperture 210 and through the ball joint 186, and the nut 220 is fastened to the lower end of the fastener 216, thereby fastening the rear end portion of the anti-rotation device 80 to the bracket 200. Should the user of the vehicle 10 decide to remove the front track assembly 26 and put the front wheel back on the vehicle, the fastener 216 and nut 220 are removed, thereby disconnecting the anti-rotation device 80 from the distal end portion 151 of the lower A-arm 36. However, the bracket 200 can remain fastened to the distal end portion 151 of the lower A-arm 36, as it is shaped and sized so as not to interfere with the wheel.

Figure 13:
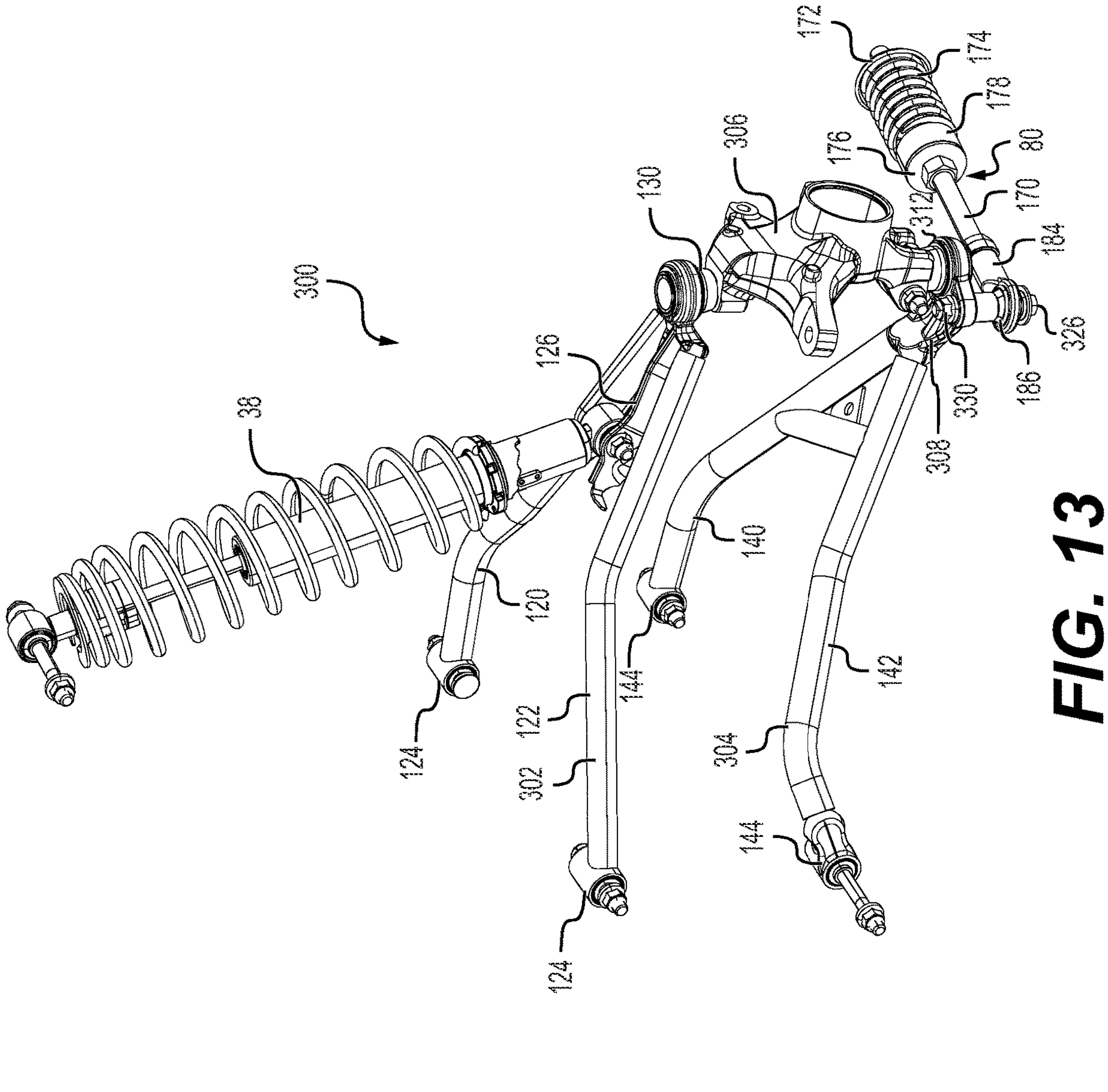
FIG. 13 is a perspective view taken from a rear, right side of alternative embodiments of the front right suspension assembly and of an anti-rotation device of the front right track assembly of the vehicle of FIG. 1.
Figure 14:
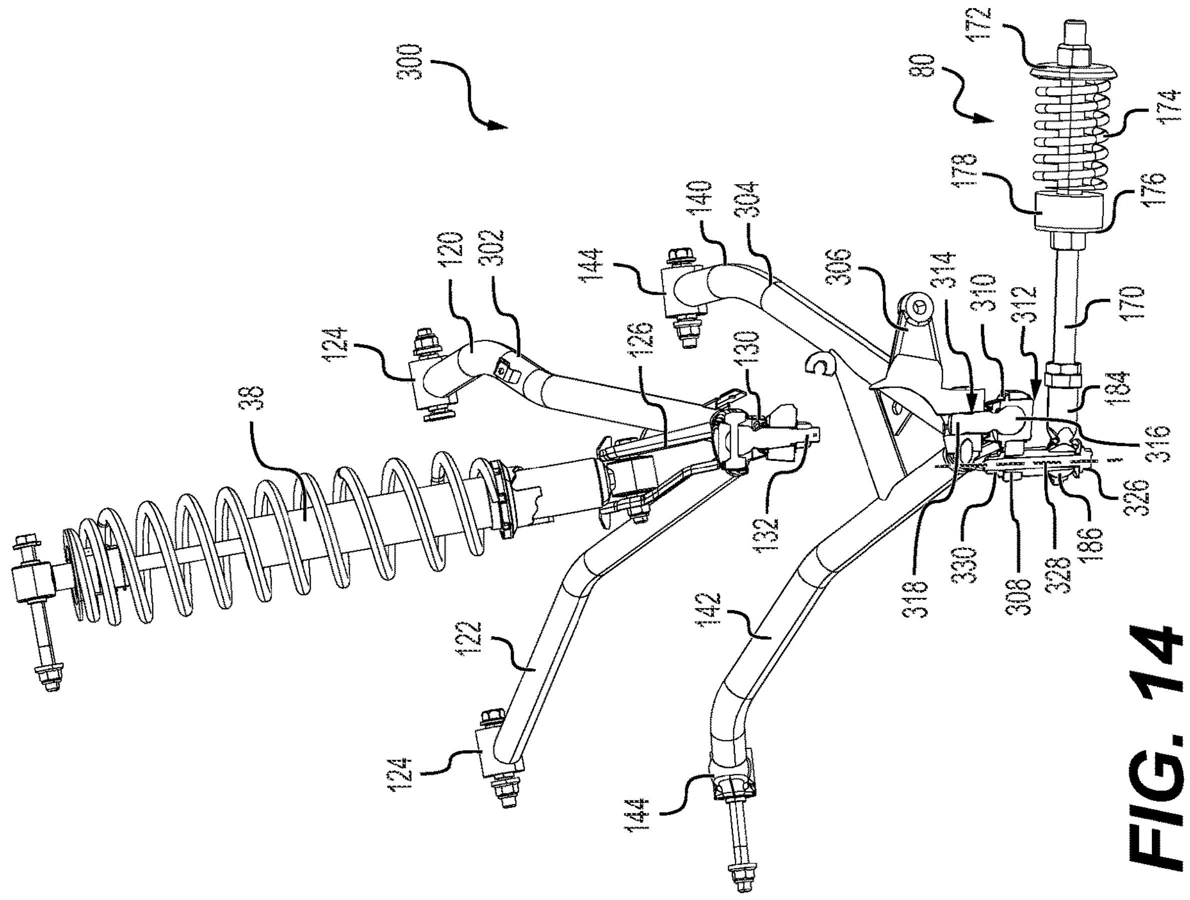
FIG. 14 is a cross-section of the components of FIG. 13 taken through a longitudinal axis of a fastener connecting the anti-rotation device to the A-arm.
Figure 15:
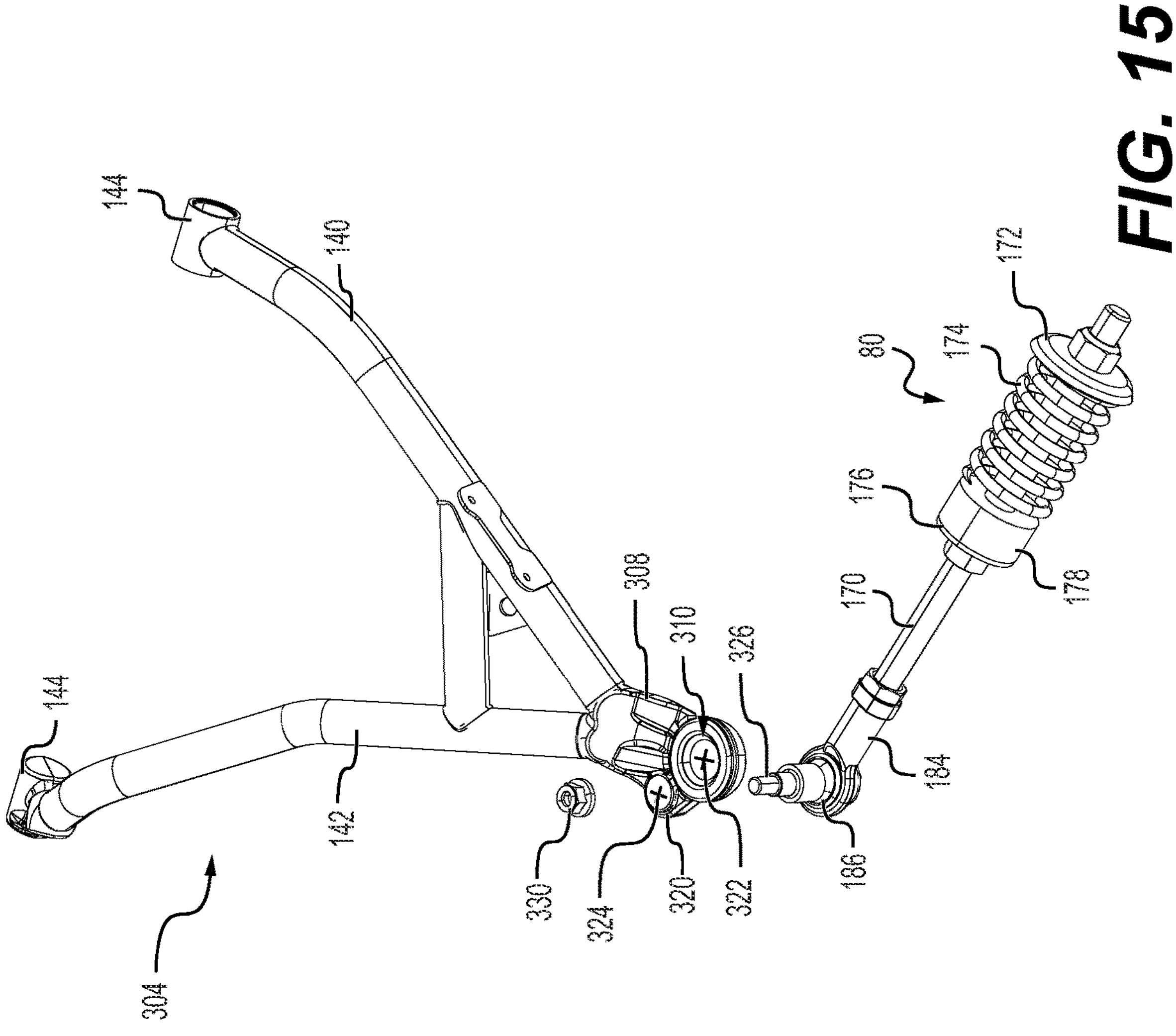
FIG. 15 is a partially exploded view of a lower A-arm and of the anti-rotation device of FIG. 13.

Turning now to FIGS. 13 to 15, an alternative embodiment of a suspension and track assembly will be described. This assembly has a front suspension assembly 300 and a front track assembly similar to the track assembly 26, including the anti-rotation device 80. Components of this embodiment of a suspension and track assembly which are similar to those described in the above embodiment have been labeled with the same reference numerals and will not be described again in detail.

The front suspension assembly 300 has the shock absorber assembly 38, an upper A-arm 302 and a lower A-arm 304. A knuckle 306 is pivotally connected to the distal ends of the A-arms 302, 304. The drive sprocket of the track assembly is fastened to the knuckle 308 via a wheel hub as in the embodiment described above.

The lower A-arm 304 is similar to the lower A-arm 36, except that instead of having a distal end portion 151, the lower A-arm 304 has a distal end portion 308. In the present embodiment, the distal end portion 308 of the lower A-arm 304 corresponds to the portion of the lower A-arm 304 that is connected to the distal ends of the front and rear members 140, 142. The distal end portion 308 of the lower A-arm 304 defines an aperture 310 (FIG. 15). A ball and socket joint 312 is received in the aperture 310. A knuckle fastener 314 (shown in FIG. 14) is connected to a lower portion of the knuckle 306. The fastener 314 includes a ball 316 of the ball and socket joint 312 and a stud 318 integrally formed with the ball 316. This arrangement pivotally connects the knuckle 306 to the distal end portion 308 of the lower A-arm 304.

The distal end portion 308 defines another fastener aperture 320. As can be seen in FIG. 15, a center 322 of the fastener apertures 310 is disposed forward of a center 324 of the fastener aperture 320. As can also be seen in FIG. 15, the center 324 of the fastener aperture 320 is disposed laterally between the center 322 of the fastener aperture 310 and the proximal end of the lower A-arm 304. The fastener aperture 320 is sized to receive a fasteners 326 and is drilled or otherwise machined in the distal end portion 308 of the lower A-arm 304.

The rear end portion of the anti-rotation device 80 is fastened to the distal end portion 308 of the lower A-arm 304 by the fastener 326 inserted through the ball joint 186 and through the fastener aperture 320. As such, the longitudinal axis 328 (FIG. 14) of the fastener 326 passes through the rear end portion of the anti-rotation device 80. A nut 330 is fastened to the end of the fastener 326 that extends above the top of the distal end portion 308 of the lower A-arm 304. In the present embodiment, the fastener 326 is a bolt 326 having a hexagonal head. In an alternative embodiment, it is contemplated that the fastener 326 could be a stud integrally formed with and extending from a top of the ball joint 186. As can be seen in the figures, the anti-rotation device 80 extends below the distal end portion 308 of the lower A-arm 304.

In this embodiment, to replace the front right wheel of the vehicle 10 with the front right track assembly 26, once the drive sprocket 62 of the of the front track assembly 26 is fastened to the knuckle 306 via the wheel hub as described above, the anti-rotation device 80, which is fastened to the frame 60 of the front sprocket track 26, is fastened to the distal end portion 308 of the lower A-arm 304 as described below. The front left track assembly 26 is mounted to the vehicle 10 in a similar manner.

The rear end portion of the anti-rotation device 80 is placed under the distal end portion 308 of the lower A-arm 304 such that a center of the ball joint 186 is aligned with the fastener aperture 320. The fastener 326 is then inserted in through the ball joint 186 and through the fastener aperture 320, and the nut 300 is fastened to the upper end of the fastener 326, thereby fastening the rear end portion of the anti-rotation device 80 to the distal end portion 308 of the lower A-arm 304.

Modifications and improvements to the above-described embodiments of the present invention may become apparent to those skilled in the art. The foregoing description is intended to be exemplary rather than limiting. The scope of the present invention is therefore intended to be limited solely by the appended claims.

What is claimed is:

1. A method for mounting a track assembly to a vehicle, the vehicle comprising:

a vehicle frame;

a motor connected to the vehicle frame;

a suspension assembly connected to the vehicle frame, the suspension assembly having an A-arm, the A-arm having a distal end portion, the distal end portion defining a fastener aperture therethrough; and a wheel operatively connected to the distal end portion, the method comprising:

disconnecting the wheel from the distal end portion of the A-arm of the suspension assembly;

pivotally connecting a frame of the track assembly to the distal end portion of the A-arm of the vehicle for permitting rotation of the track assembly about a steering axis;

inserting a fastener through the fastener aperture defined in the distal end portion of the A-arm; and fastening an anti-rotation device of the track assembly to the distal end portion of the A-arm with the fastener, the anti-rotation device being connected to the frame.

2. The method of claim 1, wherein a longitudinal axis of the fastener passes through an end portion of the anti-rotation device.

3. The method of claim 1, wherein:

the fastener aperture is a first fastener aperture;

pivotally connecting the frame to the distal end portion of the A-arm comprises:

operatively connecting a drive sprocket of the track assembly to a knuckle, the drive sprocket being rotationally connected to the frame of the track assembly, the knuckle being pivotally connected to the distal end portion of the A-arm with a knuckle fastener, the knuckle fastener being inserted in a second fastener aperture defined in the distal end portion of the A-arm; and a center of the first fastener aperture is disposed laterally between a center of the second fastener aperture and a proximal end of the A-arm.

4. The method of claim 1, further comprising mounting at least one spacer to a rack of a rack and pinion assembly of a steering system of the vehicle for limiting a steering angle of the track assembly.

5. A method for mounting a track assembly to a vehicle comprising:

pivotally connecting a frame of the track assembly to a distal end portion of an A-arm of the vehicle for permitting rotation of the track assembly about a steering axis;

inserting a first fastener through a first fastener aperture defined in the distal end portion of the A-arm;

inserting the first fastener through a first bracket aperture defined in a bracket;

fastening the bracket to the distal end portion of the A-arm with the first fastener;

inserting a second fastener through a second bracket aperture defined in the bracket; and fastening an anti-rotation device of the track assembly to the distal end portion of the A-arm with the first fastener by fastening the anti-rotation device of the track assembly to the bracket with the second fastener, a longitudinal axis of the second fastener passing through an end portion of the anti-rotation device, the anti-rotation device being connected to the frame.

6. The method of claim 5, wherein the first fastener aperture and the first bracket aperture are disposed forward of the second bracket aperture.

7. The method of claim 5, further comprising abutting the bracket with a bottom of the distal end portion of the A-arm.

8. The method of claim 5, further comprising placing at least one wall of the bracket adjacent to at least one of a front and a rear of the distal end portion of the A-arm, the at least one wall preventing rotation of the bracket relative to the distal end portion of the A-arm.

9. The method of claim 8, wherein:

the at least one wall comprises first and second walls; and placing the at least one wall of the bracket adjacent to at least one of the front and the rear of the distal end portion of the A-arm comprises:

placing the first wall adjacent to the front of the distal end portion of the A-arm; and placing the second wall adjacent to the rear of the distal end portion of the A-arm.

10. The method of claim 8, wherein the at least one wall is defined by at least one protrusion of the bracket.

11. A method for mounting a track assembly to a vehicle comprising:

pivotally connecting a frame of the track assembly to a distal end portion of an A-arm of the vehicle for permitting rotation of the track assembly about a steering axis;

inserting a first fastener through a first fastener aperture defined in the distal end portion of the A-arm;

fastening an anti-rotation device of the track assembly to the distal end portion of the A-arm with the first fastener, the anti-rotation device being connected to the frame;

inserting a second fastener through a second fastener aperture defined in the distal end portion of the A-arm; and fastening the anti-rotation device of the track assembly to the distal end portion of the A-arm with the second fastener.

12. The method of claim 11, wherein:

pivotally connecting the frame to the distal end portion of the A-arm comprises:

operatively connecting a drive sprocket of the track assembly to a knuckle, the drive sprocket being rotationally connected to the frame of the track assembly, the knuckle being pivotally connected to the distal end portion of the A-arm with a knuckle fastener, the knuckle fastener being inserted in a third fastener aperture defined in the distal end portion of the A-arm; and centers of the first and second fastener apertures are disposed laterally between a center of the third fastener aperture and a proximal end of the A-arm.

13. The method of claim 11, wherein a center of the first fastener aperture is disposed forward of a center of the second fastener aperture.

14. The method of claim 11, further comprising:

inserting the first and second fasteners through first and second bracket apertures defined in a bracket;

fastening the bracket to the distal end portion of the A-arm with the first and second fasteners; and inserting a third fastener through a third bracket aperture defined in the bracket; and fastening the anti-rotation device of the track assembly to the distal end portion of the A-arm comprises fastening the anti-rotation device of the track assembly to the bracket with the third fastener, a longitudinal axis of the third fastener passing through an end portion of the anti-rotation device.

15. The method of claim 14, wherein the first and second fastener apertures and the first and second bracket apertures are disposed forward of the third bracket aperture.

* * * * *